US008860669B2

(12) United States Patent
Kim et al.

(10) Patent No.: US 8,860,669 B2
(45) Date of Patent: Oct. 14, 2014

(54) TOUCH SCREEN PANEL INTEGRATED INTO LIQUID CRYSTAL DISPLAY, METHOD OF MANUFACTURING THE SAME, AND TOUCH SENSING METHOD

(75) Inventors: Eok-su Kim, Seongnam-si (KR);
Jae-young Choi, Suwon-si (KR);
Won-mook Choi, Hwaseong-si (KR);
Duk-hyun Choi, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 649 days.

(21) Appl. No.: 12/431,994

(22) Filed: Apr. 29, 2009

(65) Prior Publication Data

US 2010/0103121 A1    Apr. 29, 2010

(30) Foreign Application Priority Data

Oct. 28, 2008    (KR) .................. 10-2008-0105925

(51) Int. Cl.
*G06F 3/041* (2006.01)
*G06F 3/044* (2006.01)
*G02F 1/1339* (2006.01)
*G02F 1/1335* (2006.01)

(52) U.S. Cl.
CPC ............. *G06F 3/0412* (2013.01); *G06F 3/044* (2013.01); *G02F 1/133512* (2013.01); *G02F 1/13394* (2013.01)
USPC ............................ 345/173; 178/18.01; 349/12

(58) Field of Classification Search
USPC ............ 345/173–178; 349/12, 13; 178/18.01, 178/18.03, 18.05
See application file for complete search history.

(56) References Cited

U.S. PATENT DOCUMENTS

| 4,205,199 | A  | * | 5/1980  | Mochizuki ................ 178/18.03 |
| 4,290,052 | A  | * | 9/1981  | Eichelberger et al. ........ 341/33 |
| 5,929,948 | A  | * | 7/1999  | Ohori et al. .................... 349/44 |
| 6,501,529 | B1 | * | 12/2002 | Kurihara et al. .............. 349/160 |
| 6,636,288 | B2 | * | 10/2003 | Kim et al. ..................... 349/139 |
| 7,348,966 | B2 | * | 3/2008  | Hong et al. ................... 345/173 |

(Continued)

FOREIGN PATENT DOCUMENTS

| KR | 1020070103143 A | 10/2007 |
| KR | 1020080005758 A | 1/2008 |
| KR | 1020080013262 A | 2/2008 |
| KR | 1020080042294 A | 5/2008 |

*Primary Examiner* — Amare Mengistu
*Assistant Examiner* — Stacy Khoo
(74) *Attorney, Agent, or Firm* — Cantor Colburn LLP (57) ABSTRACT

A touch screen panel includes: a first substrate and a second substrate, which face each other with respect to a liquid crystal interposed therebetween; and a touch sensor interposed between the first substrate and the second substrate. The touch sensor includes: a plurality of first touch signal lines disposed on the first substrate and extending in a first direction; a protective layer disposed on the first substrate, the protective layer including a dielectric material and substantially the plurality of first touch signal lines; a plurality of contact pads disposed on the protective layer; a plurality of second touch signal lines disposed on the second substrate and extending in a second direction perpendicular to the first direction; and a plurality of touch sensor spacers electrically connected to the plurality of second touch signal lines. A gap between the touch sensor spacers and the plurality of contact pads is defined, and the spacers are disposed to face the plurality of contact pads.

14 Claims, 5 Drawing Sheets

(56) References Cited

U.S. PATENT DOCUMENTS

| | | | |
|---|---|---|---|
| 2007/0085079 A1* | 4/2007 | Lee et al. | 257/59 |
| 2007/0097278 A1* | 5/2007 | Rho et al. | 349/12 |
| 2007/0177073 A1* | 8/2007 | Seo et al. | 349/110 |
| 2007/0252614 A1* | 11/2007 | Jeon | 324/770 |
| 2007/0262967 A1* | 11/2007 | Rho | 345/173 |
| 2008/0062148 A1* | 3/2008 | Hotelling et al. | 345/174 |
| 2008/0100787 A1* | 5/2008 | Segawa et al. | 349/141 |
| 2009/0009485 A1* | 1/2009 | Bytheway | 345/174 |
| 2009/0180066 A1* | 7/2009 | Tung et al. | 349/114 |
| 2009/0284483 A1* | 11/2009 | Ting et al. | 345/173 |

* cited by examiner

TOUCH SCREEN PANEL INTEGRATED INTO LIQUID CRYSTAL DISPLAY, METHOD OF MANUFACTURING THE SAME, AND TOUCH SENSING METHOD

CROSS-REFERENCE TO RELATED APPLICATIONS

This application claims priority to Korean Patent Application No. 10-2008-0105925, filed on Oct. 28, 2008, and all the benefits accruing therefrom under 35 U.S.C. §119, the contents of which in its entirety are herein incorporated by reference.

BACKGROUND

1. Field

One or more embodiments relate to a touch screen panel integrated into a liquid crystal display, a method of manufacturing the touch screen panel, and a touch sensing method.

2. Description of the Related Art

A touch screen panel can be installed on a front surface of an electronic display device, such as a personal computer, a laptop or a portable media player ("PMP") and can be touched using a finger or a pen. Also, text or pictures can be written or drawn through the touch screen panel, thus the touch screen panel is a form of input device for inputting a specific command or data to an electronic device. Recently, as demand for user convenience increases, there is a desire for an improved touch screen panel.

A touch screen panel can be classified as a resistive overlay type or a capacitive overlay type. In a capacitive overlay type touch screen panel, a lower electrode and an upper electrode, which are patterned in directions perpendicular to each other, are separated by a dielectric material and a capacitive change due to touch at the intersection of the lower electrode and the upper electrode is recognized. In the resistive overlay type touch screen panel, a lower electrode and an upper electrode, which are patterned in directions perpendicular to each other, are separated by a spacer and a resistive change due to contact of the lower electrode and the upper electrode by touch is recognized.

The touch screen panel may be used in a display device, for example, by being disposed on a front surface of a liquid crystal display ("LCD") or by being integrated into the LCD. When the touch screen panel is integrated into the LCD, an overall thickness of the LCD may be reduced so as to facilitate a reduction of a thickness of a display device. In addition a separate module assembly process may be omitted, thus improving productivity.

However, in a touch screen panel integrated into an LCD, a touch sensor column spacer, which is electrically connected to a common electrode in an upper substrate, is made to touch a sensing line in a lower substrate due to a touch by a user. Thus a signal of the common electrode is delivered to the sensing line, and a location of the touch is recognized. This type of a touch sensor is the resistive overlay type and it can be difficult for such a touch sensor to recognize multiple touches. Also, sensing lines disposed in an X direction and a Y direction are desirably disposed respectively in the lower substrate for reading coordinates in the X-direction and the Y-direction so that an aperture ratio of the display devices may be decreased.

SUMMARY

One or more embodiments include a capacitive overlay type touch screen panel, which is integrated into a liquid crystal display ("LCD"), a method of manufacturing the touch screen panel and a touch sensing method.

Additional aspects set forth below in the description and will be apparent from the description which follows.

One or more embodiments may include a touch screen panel including: a first substrate and a second substrate, which face each other with respect to a liquid crystal interposed therebetween; and a touch sensor interposed between the first substrate and the second substrate, wherein the touch sensor includes a plurality of first touch signal lines disposed on the first substrate and extending in a first direction; a protective layer disposed on the first substrate, the protective layer including a dielectric material and substantially covering the plurality of first touch signal lines; a plurality of contact pads disposed on the protective layer; a plurality of second touch signal lines disposed on the second substrate and extending in a second direction perpendicular to the first direction; and a plurality of touch sensor spacers electrically connected to the plurality of second touch signal lines, wherein a gap between the touch sensor spacers and the plurality of contact pads is defined, and the touch sensor spacers are disposed to face the plurality of contact pads.

One of the first touch signal lines and the second touch signal lines may be scan lines and the other of the first touch signal lines and the second touch signal lines are sensing lines. The sensing lines may be electrically connected to a sensing circuit.

The second substrate may include a black matrix, which includes a conductive material and a portion of the black matrix is used as the second touch signal lines. The black matrix may include a metal, a metal oxide or a mixture thereof.

The touch sensor spacers may respectively include a column part disposed on a surface of the black matrix and a conductive film disposed on a surface of the column part and electrically connected to the black matrix.

A color filter substantially covering the black matrix may be disposed on the second substrate and a common electrode including a transparent conductive material may be disposed on the color filter. An opening may be defined around the touch sensor spacers for insulating the common electrode.

The first substrate may include a plurality of gate lines, a plurality of data lines disposed substantially perpendicular to each other and a thin film transistor ("TFT"), and wherein the first touch signal lines extend in a direction parallel to the gate lines.

The protective layer may substantially cover the gate lines, the data lines and the TFT, and a plurality of pixel electrodes electrically connected to a drain electrode of the TFT may be disposed on the protective layer. The pixel electrodes and the contact pads may be include of a transparent conductive material.

The touch screen panel may further include a supporting spacer between the first substrate and the second substrate for maintaining a cell gap therebetween, wherein the touch sensor spacers have a height, which is less than a height of the supporting spacer.

To achieve the above and/or other aspects, one or more embodiments includes a sensing method in the touch screen panel of claim 1, the method including: simultaneously driving any one of the first touch signal lines and the second touch signal lines and sequentially driving the other of the first touch signal lines and the second touch signal lines by a selected time interval; and sensing a capacitive change between the contact pads and the first touch signal lines through a sensing circuit electrically connected to the signal lines, which are simultaneously driven.

The first touch signal lines may be scan lines and the second touch signal lines may be sensing lines, the sensing lines being simultaneously driven and the scan lines being sequentially driven.

To achieve the above and/or other aspects, one or more embodiments includes method of manufacturing a touch screen panel, the method including: disposing on a first substrate a plurality of first touch signal lines extending in a first direction; disposing on the first substrate a protective layer including a dielectric material to substantially cover the first touch signal lines; disposing a plurality of contact pads on the protective layer; disposing on a second substrate a black matrix including a conductive material and extending in a second direction perpendicular to the first direction; disposing on a surface of the black matrix a plurality of touch sensor spacers respectively corresponding to the plurality of contact pads; combining the first substrate and the second substrate to face each other so as to define a gap between the contact pads and the touch sensor spacers; and disposing a liquid crystal in a space between the first substrate and the second substrate.

In the disposing of the plurality of first touch signal lines, a plurality of gate lines and a plurality of data lines may be disposed to cross each other, and a TFT may be disposed at each intersection of the gate lines and the data lines on the first substrate.

In the disposing of the plurality of contact pads, a plurality of pixel electrodes electrically connected to a drain electrode of the TFT may be disposed on the protective layer. The contact pads and the pixel electrodes may include a transparent conductive material.

The disposing of the plurality of touch sensor spacers may include: disposing a color filter on the second substrate to substantially cover the black matrix; patterning the color filter to define an opening partially exposing the black matrix; disposing a column part of the touch sensor spacers on the surface of the black matrix exposed through the openings; disposing a transparent conductive material on a surface of the color filter and a surface of the column part, disposing a common electrode on the surface of the color filters, and disposing a conductive film on the surface of the column part; and removing the conductive material disposed on the opening and insulating the common electrode from the conductive film.

In the disposing of the column part includes simultaneously disposing a supporting spacer on the surface of the color filter.

BRIEF DESCRIPTION OF THE DRAWINGS

These and/or other aspects will become apparent and more readily appreciated from the following description of the disclosed embodiments, taken in conjunction with the accompanying drawings in which.

DETAILED DESCRIPTION

Reference is now made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, with reference to the figures, to explain aspects, advantages and features of the embodiments.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., can be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the exemplary embodiments of the invention.

Spatially relative terms, such as "below," "lower," "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device can be otherwise oriented (rotated 90 degrees or at other orientations) and the spatially relative descriptors used herein interpreted accordingly.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation can result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Figure 1:
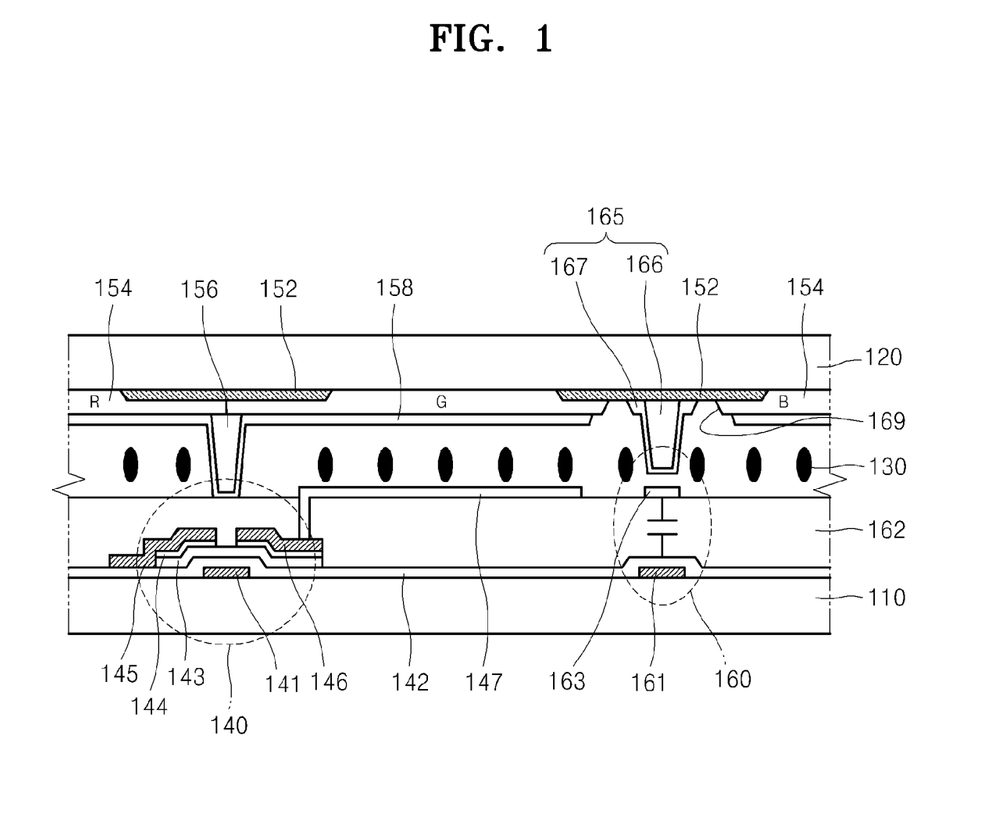
FIG. 1 is a cross-sectional view of an exemplary embodiment of a capacitive overlay type touch screen panel, which is integrated into a liquid crystal display ("LCD")
Figure 2:
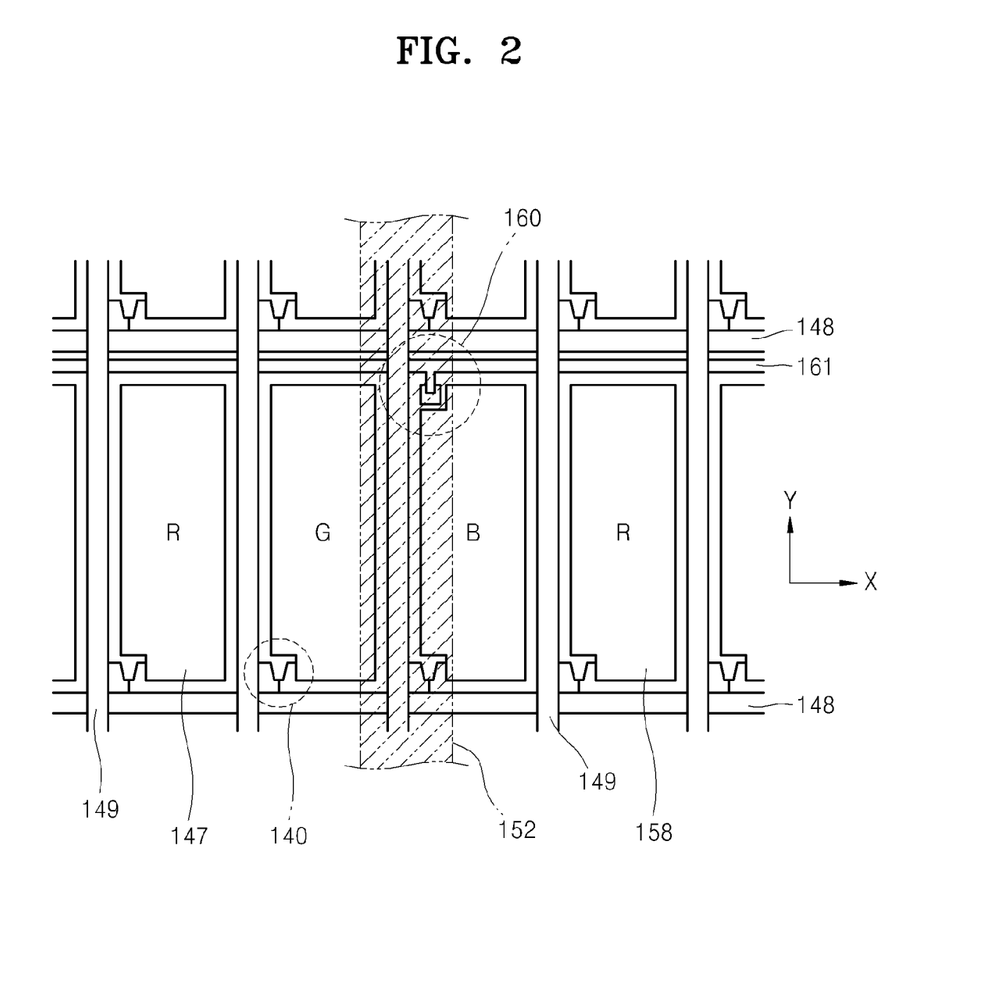
FIG. 2 is a plan view of the touch screen panel of FIG. 1.

FIG. 1 is a cross-sectional view of an exemplary embodiment a capacitive overlay type touch screen panel, which is integrated into a liquid crystal display ("LCD") and FIG. 2 is a plan view of the touch screen panel of FIG. 1. In FIG. 1, only an upper substrate is rotated by 90° to clarify the inner structure of the touch screen panel.

Referring to FIGS. 1 and 2, the capacitive overlay type touch screen panel according to an embodiment includes a first substrate 110 and a second substrate 120, which face each other with respect to a liquid crystal 130 interposed therebetween, and a plurality of touch sensors 160, which can be capacitive overlay type touch sensors. The first substrate 110 and the second substrate 120 may comprise a transparent glass substrate, a polymer substrate or the like, or a combination comprising at least one of the foregoing. In an embodiment, the first substrate 110 and the second substrate 120 consist essentially of a transparent glass substrate, a polymer substrate or the like, or a combination thereof. In another embodiment, the first substrate 110 and the second substrate 120 consist of a transparent glass substrate, a polymer substrate or the like, or a combination thereof.

A plurality of thin film transistors ("TFTs") 140, which are switching devices, are disposed in a matrix form on the first substrate 110, which can be a lower substrate. The plurality of TFTs 140 each respectively include a gate electrode 141 disposed on the first substrate 110, a dielectric layer 142 disposed on the gate electrode 141, and a source electrode 145 and a drain electrode 146 formed on the dielectric layer 142. An activation layer 143 forming a channel between the source electrode 145 and the drain electrode 146 may be interposed between the dielectric layer 142 and the source electrode 145 and drain electrode 146. Also, an ohmic contact layer 144 may be interposed between the activation layer 143 and the source electrode 145 and between the activation layer 143 and the drain electrode 146 to improve ohmic contact between the activation layer 143, the source electrode 145 and the drain electrode 146. The plurality of TFTs 140 may be covered by a protective layer 162. The protective layer 162 may comprise a dielectric material for forming a capacitor comprising the touch sensors 160. In an embodiment, the protective layer 162 may consist essentially of a dielectric material for forming a capacitor of the touch sensors 160. In another embodiment, the protective layer 162 may consist of a dielectric material for forming a capacitor of the touch sensors 160.

A plurality of gate lines 148 and a plurality of data lines 149 are disposed substantially perpendicular to each other on the first substrate. The plurality of gate lines 148 may extend in a first direction, for example in an X-axis direction, and the plurality of data lines 149 may extend in a second direction, which is perpendicular to the first direction, for example, a Y-axis direction. The plurality of gate lines 148 are disposed on the first substrate, are electrically connected to the gate electrodes 141 and are substantially covered by the dielectric layer 142. The plurality of data lines 149 are disposed on the dielectric layer 142, are electrically connected to the source electrode 145 and are substantially covered by the protective layer 162. In other words, the plurality of gate lines 148 and the plurality of data lines 149 are disposed to cross each other with respect to the dielectric layer 142 interposed therebetween. The TFTs 140 are respectively disposed at each intersection of the plurality of gate lines 148 and the plurality of data lines 149. Also, a plurality of pixel electrodes 147, corresponding to each pixel, are disposed on the protective layer 162 and are electrically connected to the drain electrodes 146 through a contact hole. The plurality of pixel electrodes 147 may comprise a transparent conductive material. In an embodiment, the plurality of pixel electrodes 147 may consist essentially of a transparent conductive material. In another embodiment, the plurality of pixel electrodes 147 may consist of a transparent conductive material.

A black matrix 152, a color filter 154 and a common electrode 158 are disposed on the second substrate 120, which can be an upper substrate. The black matrix 152 comprises an opaque material so as to reduce or essentially prevent light from passing therethrough, is interposed between the pixels, and can extended in the second direction, which can be a Y-axis direction. The color filter 154 can be red R, green G or blue B and can correspond to each pixel. The common electrode 158 can comprise a transparent material and can be disposed on a surface of the color filter 154.

A supporting spacer 156 maintains a cell gap and is interposed between the first substrate 110 and the second substrate 120. The supporting spacer 156 may be disposed on the second substrate 120, which can be flatter than the first substrate 110 and can have a rectilinear structure. In an embodiment, the supporting spacer 156 is disposed on the surface of the color filter 154 and the common electrode 158 may be disposed on the surface of the color filter 154 and a surface of the supporting spacer 156.

When a scan signal is applied to the gate lines 148 and a video signal is applied to the data lines 149, the pixel corresponding to the intersection is selected. In an embodiment, a TFT of the selected pixel is turned on and an electric field is formed between the pixel electrodes 147 and the common electrode 158 so that a molecular arrangement of the liquid crystal 130 is changed and a transmissivity of incident light is changed. Light penetrating the liquid crystal 130 is colored by the color filter 154, which can be red, blue or green, and is emitted toward the front of the touch screen panel.

The capacitive overlay type touch sensors 160 are interposed between the first substrate 110 and the second substrate 120. The touch sensors 160 include a plurality of first touch signal lines 161, a plurality of second touch signal lines 168, a plurality of touch sensor spacers 165, and a plurality of contact pads 163, wherein the plurality of touch sensor spacers 165 are electrically connected to a plurality of second touch signal lines 168 and the plurality of contact pads 163 are disposed to face the plurality of touch sensor spacers 165 at selected intervals.

First touch signal lines 161 and the contact pads 163 are disposed on the first substrate. The first touch signal lines 161 are disposed on the first substrate and comprise a conductive material, which can be a same material as a material of the gate lines 148 and the gate electrodes 141 and are substantially covered by the dielectric layer 142 and the protective layer 162. The first touch signal lines 161 extend in a direction substantially perpendicular to the black matrix 152, which is disposed on the second substrate 120, thus can be disposed parallel to an X-axis direction. Also, the first touch signal lines 161 may extend in a direction parallel to the gate lines 148. A space between the first touch signal lines 161 may be selected to correspond to a resolution of the touch sensors 160. In an embodiment, each of the first touch signal lines 161 may be disposed to correspond to each of the gate lines 148 or to correspond to the number of data lines 149.

The contact pads 163 are disposed on the protective layer 162, which is disposed on the first substrate 110. The contact pads 163 may comprise a transparent conductive material, which is a same material as the transparent conductive material of the pixel electrodes 147. In an embodiment, the contact pads 163 may consist essentially of a transparent conductive material, which is a same material as the transparent conductive material of the pixel electrodes 147. In another embodiment, the contact pads 163 may consist of a transparent conductive material, which is a same material as the transparent conductive material of the pixel electrodes 147. The contact pads 163 are disposed above the first touch signal lines 161, respectively, and are disposed to correspond to the touch sensor spacers 165. Thus, capacitors may be disposed having a structure in which the protective layer 162, which comprises a dielectric material, is disposed between the conductive first touch signal lines 161 and the conductive contact pads 163.

The second touch signal lines 168 and the touch sensor spacers 165 can be disposed on the second substrate 120. A portion of the black matrix 152 extends in a direction perpendicular to the first touch signal lines 161, which can be disposed on the first substrate 110, thus can be parallel to the Y-axis direction and may be used as the second touch signal lines 168. Accordingly, the black matrix 152 may comprise an electrically conductive material. In an embodiment, the black matrix can comprise a metal, such as chrome, a metal oxide or the like, or a mixture thereof. In an embodiment, the black matrix can consist essentially of a metal, such as chrome, a metal oxide or the like, or a mixture thereof. In another embodiment, the black matrix can consist of a metal, such as chrome, a metal oxide or the like, or a mixture thereof. The insulation between the black matrix 152, which can be the second touch signal lines 168, and the common electrode 158 may be the color filter 154. In another embodiment a separate dielectric layer may be further included between the black matrix 152 and the common electrode 158. In another embodiment, the black matrix 152 may extend in the Y-axis direction and in the X-axis direction. In this embodiment, the black matrix 152, when used as the second touch signal lines 168, is insulated from the portion extending in the X-axis direction.

The touch sensor spacers 165 are electrically connected to the second touch signal lines 168. Accordingly, the touch sensor spacers 165 are disposed on a surface of the black matrix 152, which can be the second touch signal lines 168. Also, the touch sensor spacers 165 are disposed to respectively correspond to the contact pads 163 disposed on the first substrate 110. The touch sensor spacers 165 may respectively include a column part 166 and a conductive film 167 disposed on a surface of the column part 166. The conductive film 167 may comprise a conductive material, which is the same material as the material of the common electrode 158, and may be electrically connected to the black matrix 152. In addition, an opening 169 is defined around each of the touch sensor spacers 165 and electrical insulation between the conductive film 167 and the common electrode 158 may be provided by the opening 169. Also, due to the opening 169, the touch sensor spacers 165 have a height, which is less than a height of the supporting spacers 156 and thereby a selected gap may be formed between the touch sensor spacers 165 and the contact pads 163.

The first touch signal lines 161 disposed on the first substrate 110 and the second touch signal lines 168 disposed on the second substrate 120 are used as scan lines and sensing lines of the touch sensors 160. In an embodiment, the first touch signal lines 161 may be used as scan lines and the second touch signal lines 168 may be used as sensing lines, or vice versa. When the second touch signal lines 168 are used as the sensing lines, a sensing circuit 170, shown in FIG. 3, may be electrically connected to the black matrix 152, which can be used as the second touch signal lines 168.

In the touch screen panel described above, when pressure is applied to a surface of the second substrate 120, the second substrate 120 is deformed and the touch sensor spacers 165 contact the contact pads 163 disposed on the first substrate 110. Accordingly, a capacitance between the contact pads 163 and the first touch signal lines 161 is changed and the capacitive change is sensed through the sensing circuit 170, thereby recognizing a touch location in the X-axis direction and the Y-axis direction.

As described above, the black matrix 152 disposed on the second substrate 120 is used as the signal lines of the touch sensors 160, for example, the sensing lines, thus disposing separate signal lines can be omitted, thereby increasing an aperture ratio of the display device. Therefore, a transmissivity of light increases due to an increase in the aperture ratio, thus picture quality may be improved and consumed power may be reduced.

Figure 3:
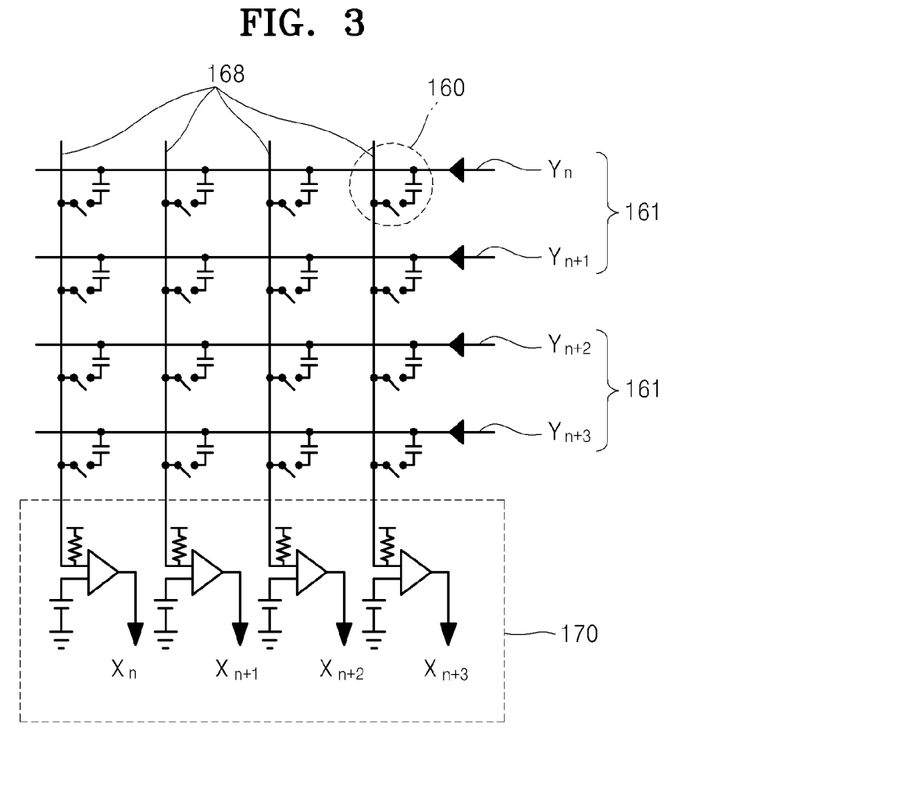
FIGS. 3 and 4 illustrate a touch sensing method used in the touch screen panel of FIG. 1.
Figure 4:
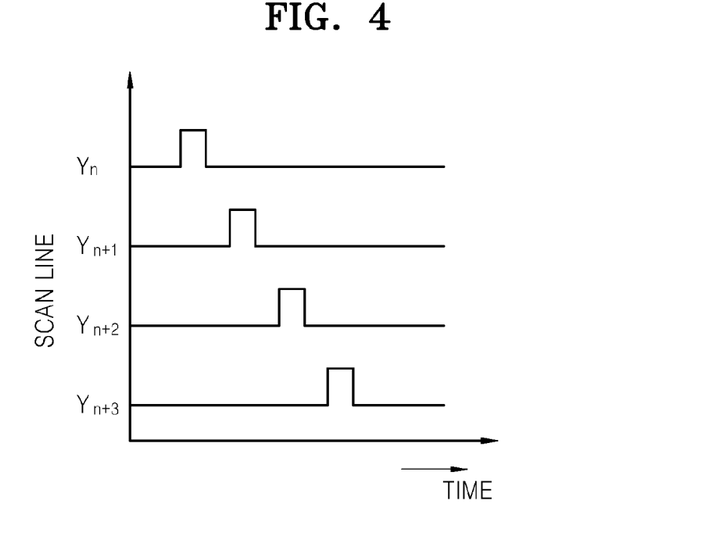

FIGS. 3 and 4 illustrate a touch sensing method used in the touch screen panel of FIG. 1. In this embodiment, the first touch signal lines 161 are used as the scan lines and the second touch signal lines 168 are used as the sensing lines.

Referring to FIGS. 3 and 4, a signal is firstly applied to a first scan line Yn and the sensing lines 168 are simultaneously driven, thereby recognizing a capacitive change through the sensing circuit 170. Thus, whether a touch occurred and a touch location in the first scan line Yn may be determined. Then, a signal is applied to a second scan line Yn+1 (and a third scan line Yn+2, a fourth scan line Yn+3, and the like) and the sensing lines 168 are simultaneously driven, thereby recognizing the capacitive change through the sensing circuit 170. Thus, whether a touch occurred and a touch location in the second scan line Yn+1 may be determined. Accordingly, when a plurality of scan lines are sequentially driven with a selected time interval in this manner, whether a touch occurred and a touch location in each of the scan lines may be determined and thus multiple touches may be recognized.

As described above, in a touch screen panel according to an embodiment, the capacitive change is sensed through the first touch signal lines 161 disposed on the first substrate 110 and the sensing lines 168 disposed on the second substrate 120 and such a capacitive change is sensed by a scan method comprising sequentially driving the scan lines, such as the first touch signal lines 161, thereby recognizing multiple touches.

Hereinafter, a method of manufacturing the above touch screen panel is described.

Figure 5A:
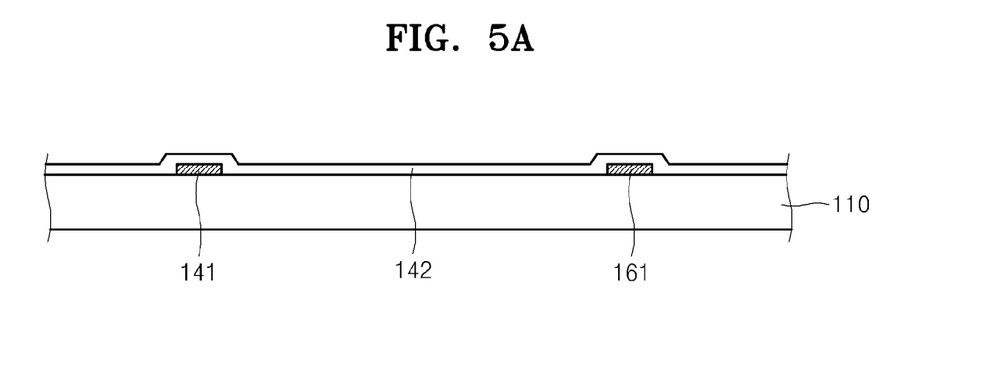
FIGS. 5A through 5C are cross-sectional diagrams and illustrate an exemplary embodiment of a method of disposing elements on a first substrate of FIG. 1.
Figure 5B:
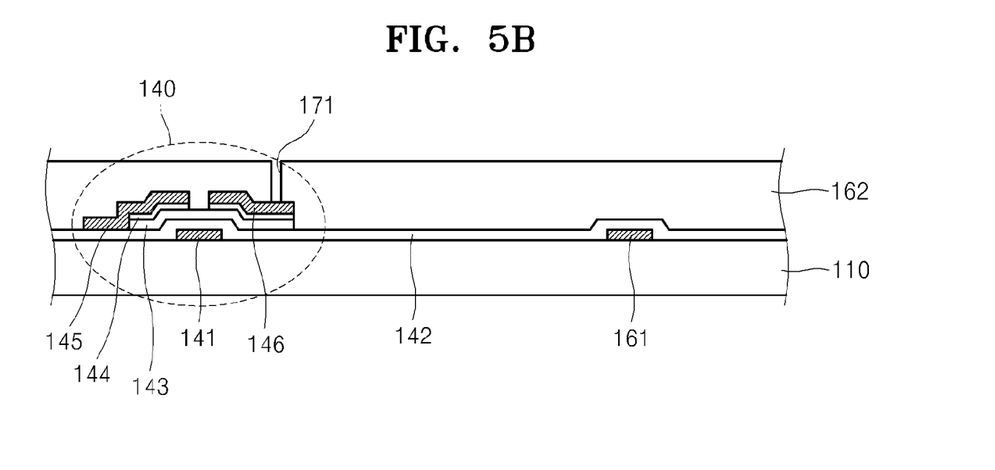
Figure 5C:
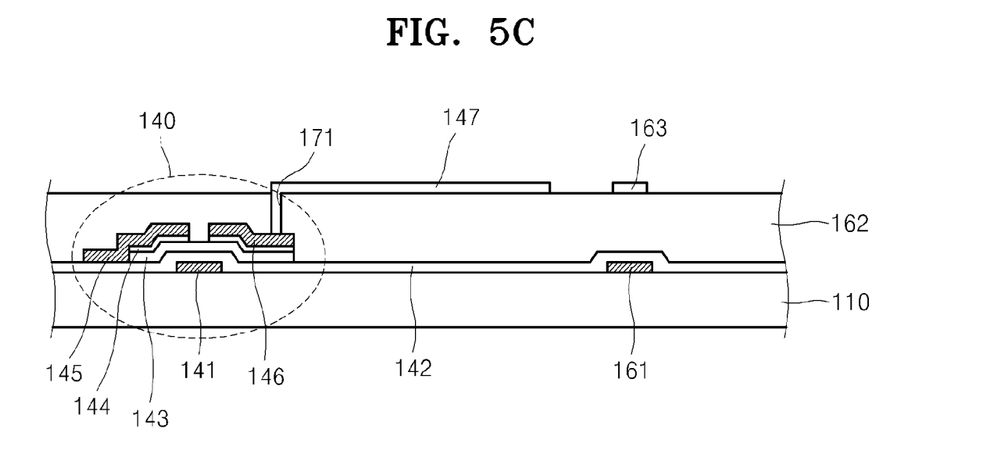

FIGS. 5A through 5C are cross-sectional diagrams and illustrate a method of disposing elements on the first substrate 110, which is shown in FIG. 1.

Referring to FIG. 5A, the first substrate 110 is disposed. The first substrate 110 may comprise a transparent glass substrate, a polymer substrate or the like, or a combination comprising at least one of the foregoing. In an embodiment, the first substrate 110 may consist essentially of a transparent glass substrate, a polymer substrate or the like, or a combination thereof. In another embodiment, the first substrate 110 may consist of a transparent glass substrate, a polymer substrate or the like, or a combination thereof. A conductive metal material is disposed on the first substrate 110 and is patterned, thereby forming the gate electrodes 141 of TFTs 140 and the first touch signal lines 161 of the touch sensors 160. The conductive metal material may include, for example, chrome, aluminum, molybdenum, silver or the like, or a mixture thereof. In an embodiment, the conductive metal material may consist essentially of chrome, aluminum, molybdenum, silver or the like, or a mixture thereof. In another embodiment, the conductive metal material may consist of chrome, aluminum, molybdenum, silver or the like, or a mixture thereof. As described above, the first touch signal lines 161 may be scan lines. In an embodiment, the gate lines 148 (as shown in to FIG. 2), which are electrically connected to the gate electrodes 141, may be also disposed. The first touch signal lines 161 and the gate lines 148 may extend in a direction parallel to each other and in the same direction, for example, in an X-axis direction. Then, the dielectric layer 142 covering the first touch signal lines 161, the gate lines 148 and the gate electrodes 141 is disposed on the first substrate 110.

Referring to FIG. 5B, the activation layer 143 and the ohmic contact layer 144 are disposed on the dielectric layer 142. Then a conductive metal material is disposed and is patterned, thereby forming the source electrode 145 and the drain electrode 146 of the TFT 140. The conductive metal material may include, for example, chrome, aluminum, molybdenum, silver, or the like, or a mixture thereof. In an embodiment, the conductive metal material may consist essentially of chrome, aluminum, molybdenum, silver, or the like, or a mixture thereof. In another embodiment, the conductive metal material may consist of chrome, aluminum, molybdenum, silver, or the like, or a mixture thereof. In this embodiment, the data line 149 (shown in FIG. 2), which is electrically connected to the source electrode 145, may be also disposed. The data line 149 may extend in a direction perpendicular to the gate line 148, for example, in a Y-axis direction. Then, the protective layer 162 covering the TFT 140, the data line 149 and the dielectric layer 142 is disposed on first lower substrate 110. The protective layer 162 may comprise a dielectric material, which is a same material as a material of a capacitor of the touch sensors 160. Then, a contact hole 171 exposing the drain electrode 146 is formed in the protective layer 162.

Referring to FIG. 5C, a transparent conductive material, for example, indium tin oxide ("ITO"), aluminum zinc oxide ("AZO"), indium zinc oxide ("IZO") or the like, or a combination comprising at least one of the foregoing transparent conductive materials is disposed on the protective layer 162 and is patterned, thereby forming the pixel electrodes 147 electrically connected to the drain electrodes 146 through the contact holes 171, and the contact pads 163 of the touch sensors 160. In this embodiment, the contact pads 163 may be disposed to be located right above the first touch signal lines 161.

Figure 6A:
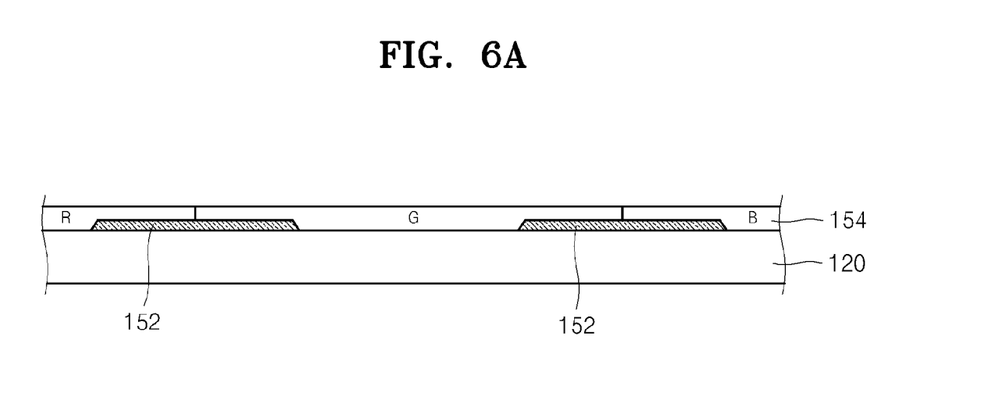
FIGS. 6A through 6C are cross-sectional diagrams and illustrate an exemplary embodiment of a method of disposing elements on a second substrate of FIG. 1.
Figure 6B:
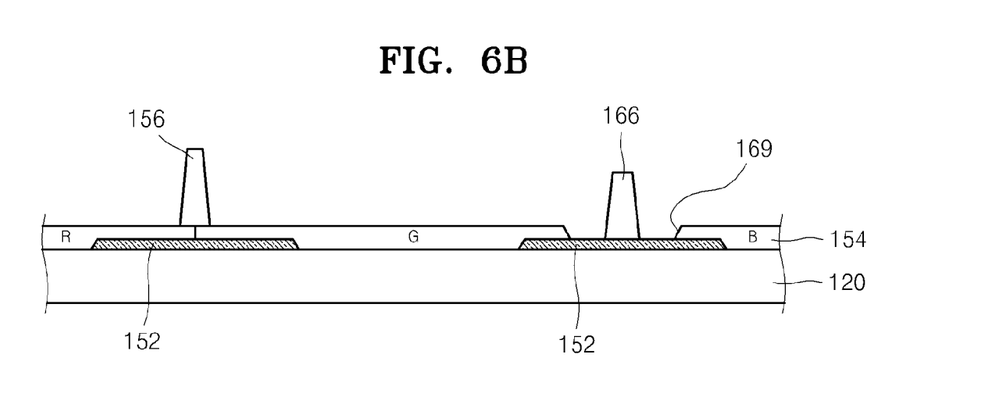
Figure 6C:
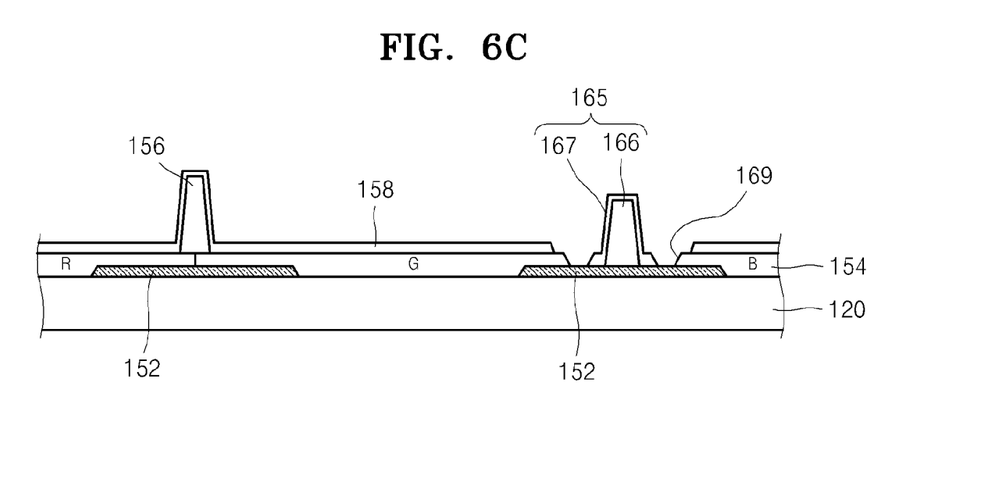

FIGS. 6A through 6C are cross-sectional diagrams and illustrate an exemplary embodiment of a method of disposing elements on the second substrate 120 of FIG. 1.

Referring to FIG. 6A, the second substrate 120 is disposed. The second substrate 120 may be a transparent polymer substrate having excellent flexibility and elasticity. A conductive material, for example, a metal such as chrome, a metal oxide or the like, or a mixture thereof, is disposed on the second substrate 120 and is patterned, thereby disposing the black matrix 152. The black matrix 152 may extend in a direction substantially perpendicular to the first touch signal line 161, which is disposed on the first substrate 110, for example, in a Y-axis direction. As described above, a portion of the black matrix 152 having conductivity can be used as the second touch signal lines 168 of the touch sensors 160 and the second touch signal lines 168 may be the sensing lines. Then, a color filter 154, which can have red R, green G and blue B portions, is disposed on the second substrate 120 to substantially cover the black matrix 152.

Referring to FIG. 6, the color filter 154 is patterned and an opening 169 formed to partially expose the black matrix 152, which can be used as the second touch signal lines 168. Then, the supporting spacers 156 are disposed on a surface of the color filter 154 and the column parts 166 of the touch sensor spacers 165 are disposed on a surface of the black matrix 152, which is exposed through the openings 169. In this embodiment, although the supporting spacers 156 and the column parts 166 of the touch sensor spacers 165 are simultaneously disposed, the column parts 166 of the touch sensor spacers 165 may have height, which is less than a height of the supporting spacers 156 due to the openings 169 in the color filter 154. Accordingly, a selected gap may be disposed between the touch sensor spacers 165 disposed on the second substrate 120 and the contact pads 163 disposed on the first substrate 110.

Referring to FIG. 6C, a transparent conductive material, for example, ITO, AZO, IZO or the like, or a combination comprising at least one of the foregoing transparent conductive materials is disposed on substantially an entire surface of the structure illustrated in FIG. 6B, thereby disposing the common electrode 158 on the surface of the color filter 154 and the conductive film 167 on a surface of the column parts 166. In this embodiment, the conductive material disposed on the opening 169 is removed so that the common electrode 158 is insulated from the conductive film 167. Then, the touch sensor spacers 165 for touch sensors are disposed, the touch sensor spacers 165 comprising the column parts 166 and the conductive film 167, which is electrically connected to the black matrix 152, which is used as the second touch signal lines 168.

Then the first substrate 110, illustrated in FIG. 5C, and the second substrate 120, illustrated in FIG. 6, are combined to face each other and the liquid crystal 130 is disposed in a space between the first substrate 110 and the second substrate 120. Thus, the touch screen panel as illustrated in FIG. 1 may be manufactured in the above-described manner.

It should be understood that the exemplary embodiments described herein should be considered in a descriptive sense only and not for purposes of limitation. Descriptions of features or aspects of each embodiment should be considered as available for other similar features or aspects in other embodiments.

What is claimed is:

1. A touch screen panel comprising:
   a first substrate and a second substrate, which face each other with respect to a liquid crystal interposed therebetween; and
   a touch sensor interposed between the first substrate and the second substrate, wherein the touch sensor comprises a plurality of first touch signal lines disposed on the first substrate and extending in a first direction;

a protective layer disposed on the first substrate, the protective layer comprising a dielectric material which substantially covers the plurality of first touch signal lines and forms a capacitor of the touch sensor;

a plurality of contact pads disposed on the protective layer;

a plurality of second touch signal lines disposed on the second substrate and extending in a second direction perpendicular to the first direction, a capacitive change between the plurality of contact pads and the plurality of the first touch signal lines being sensed through a sensing circuit which are connected to one of the plurality of the first touch signal lines and the plurality of the second touch signal lines;

a plurality of touch sensor spacers electrically connected to the plurality of second touch signal lines, wherein a gap between the touch sensor spacers and the plurality of contact pads is defined, and the touch sensor spacers are disposed to face the plurality of contact pads, and wherein the second substrate includes a black matrix, which comprises a conductive material and a portion of the black matrix is used as the second touch signal lines;

a color filter on the second substrate to cover the black matrix, the color filter having an opening exposing the portion of the black matrix;

a column part on an exposed surface of the portion of the black matrix by the opening;

a conductive film on a surface of the column part, the conductive film electrically connected to the portion of the black matrix; and a common electrode on the color filter, the common electrode including a transparent conductive material, wherein the common electrode and the conductive film is separated and insulated from each other by the opening.

2. The touch screen panel of claim 1, wherein one of the first touch signal lines and the second touch signal lines are scan lines and the other of the first touch signal lines and the second touch signal lines are sensing lines.

3. The touch screen panel of claim 1, wherein the black matrix comprises a metal, a metal oxide or a mixture thereof.

4. The touch screen panel of claim 1, wherein the common electrode and the conductive film are made of same material.

5. The touch screen panel of claim 1, wherein the opening is defined around the conductive film on the touch sensor spacers for insulating the conductive film from the common electrode.

6. The touch screen panel of claim 1, wherein the first substrate comprises a plurality of gate lines, a plurality of data lines disposed substantially perpendicular to each other and a thin film transistor, and wherein the first touch signal lines extend in a direction parallel to the gate lines.

7. The touch screen panel of claim 6, wherein the protective layer substantially covers the gate lines, the data lines and the TFT, and a plurality of pixel electrodes electrically connected to a drain electrode of the TFT is disposed on the protective layer.

8. The touch screen panel of claim 6, wherein the pixel electrodes and the contact pads comprise a transparent conductive material.

9. The touch screen panel of claim 1, further comprising a supporting spacer between the first substrate and the second substrate for maintaining a cell gap therebetween, wherein the touch sensor spacers have a height, which is less than a height of the supporting spacer.

10. A method of manufacturing a touch screen panel, the method comprising:

disposing on a first substrate a plurality of first touch signal lines extending in a first direction;

disposing on the first substrate a protective layer comprising a dielectric material, which substantially covers the first touch signal lines and forms a capacitor of the touch sensor;

disposing a plurality of contact pads on the protective layer;

disposing on a second substrate a black matrix comprising a conductive material and extending in a second direction perpendicular to the first direction, a capacitive change between the plurality of contact pads and the plurality of the first touch signal lines being sensed through a sensing circuit which is connected to one of the plurality of the first touch signal lines and the plurality of the second touch signal lines;

disposing on a surface of the black matrix a plurality of touch sensor spacers respectively corresponding to the plurality of contact pads;

combining the first substrate and the second substrate to face each other so as to define a gap between the contact pads and the touch sensor spacers; and disposing a liquid crystal in a space between the first substrate and the second substrate, and wherein the disposing of the plurality of touch sensor spacers comprises:

disposing color filters on the second substrate to substantially cover the black matrix;

patterning the color filters to define an opening partially exposing the black matrix;

disposing a column part of the touch sensor spacers on the surface of the black matrix exposed through the openings;

disposing a transparent conductive material on a surface of the color filters and a surface of the column part to form a common electrode on the surface of the color filters and a conductive film on the surface of the column part; and removing the transparent conductive material disposed on the opening so as to insulate the common electrode on the surface of the color filters from the conductive film on the surface of the column part.

11. The method of claim 10, wherein the disposing of the plurality of first touch signal lines comprises disposing a plurality of gate lines and a plurality of data lines disposed to cross each other, and a TFT disposed at each intersection of the gate lines and the data lines on the first substrate.

12. The method of claim 11, wherein the disposing of the plurality of contact pads comprises disposing a plurality of pixel electrodes electrically connected to a drain electrode of the TFT on the protective layer.

13. The method of claim 12, wherein the contact pads and the pixel electrodes comprise a transparent conductive material.

14. The method of claim 10, wherein the disposing of the column part comprises simultaneously disposing a supporting spacer on the surface of the color filter.

* * * * *